United States Patent [19]
Kaneko et al.

[11] Patent Number: 5,775,370
[45] Date of Patent: Jul. 7, 1998

[54] FLUID PRESSURE CONTROL VALVE APPARATUS

[75] Inventors: Takeshi Kaneko; Akira Matuo, both of Kanagawa-ken, Japan

[73] Assignee: Nabco Ltd., Japan

[21] Appl. No.: 614,384

[22] Filed: Mar. 12, 1996

[30] Foreign Application Priority Data

Mar. 13, 1995 [JP] Japan .................... 7-081737

[51] Int. Cl.$^6$ .................... F16K 31/12; F16K 31/26
[52] U.S. Cl. .................... 137/505.25; 137/315; 251/337
[58] Field of Search .................... 137/505.25, 315; 251/337

[56] References Cited

U.S. PATENT DOCUMENTS

| 2,594,405 | 3/1952 | Deters | 251/337 |
| 3,430,648 | 3/1969 | Botkin | 137/493 |
| 4,314,664 | 2/1982 | Wisyanski | 251/337 |
| 5,052,759 | 10/1991 | Tanaka . | |

FOREIGN PATENT DOCUMENTS

| 383507 | 8/1990 | European Pat. Off. . |
| 393274 | 10/1990 | European Pat. Off. . |
| 457513 | 11/1991 | European Pat. Off. . |
| 96264 | 10/1991 | Japan . |

*Primary Examiner*—Denise L. Ferensic
*Assistant Examiner*—Joanne Kim
*Attorney, Agent, or Firm*—Rudnick & Wolfe

[57] ABSTRACT

A fluid pressure control valve apparatus, including a main body in which an input opening is formed in communication with a master cylinder and an output opening is formed in communication with a wheel cylinder. A stepped bore in the main body communicates with the openings, the bore being enlarged in the direction towards the input side. A cover member is inserted into the input opening and a stepped piston sidably fits into the bore and extends between a through hole of the cover member and the output opening side of the bore. A path in the piston has one end communicating with the through hole of the cover member and another end communicating with the output opening side. A valve seat formed at the one end of the path and a valve body are arranged in a valve chamber formed in the through hole of the cover member. A valve spring urges the valve body toward the valve seat and a retainer member supports one end of the valve spring. A pre-loaded spring urges the piston in a direction to separate from the valve body. An annular thin projecting portion formed integrally with the main body at the input opening side projects outwards from the end of the cover member and the cover member is fixed to the main body by deforming the projecting portion towards the cover member. An outer circumferential portion of the retainer member is held between the deformed projecting portion and the cover member.

5 Claims, 4 Drawing Sheets

(A)

(B)

(C)

FLUID PRESSURE CONTROL VALVE APPARATUS

BACKGROUND OF THE INVENTION

1. Field of the Invention

This invention relates to a fluid pressure control valve apparatus which is used in a fluid pressure braking apparatus for vehicle.

2. Description of the Prior Art

The U.S. Pat. No. 5,052,759 discloses a fluid pressure control valve apparatus as shown in FIG. 1. The fluid pressure control valve apparatus is generally denoted by a reference numeral 101 in FIG. 1. A stepped bore 104 is made in a main body 102 of the fluid pressure control valve apparatus 101. A cover member 105 having a through hole 105a is inserted into the input opening 123 side of the stepped bore 104, and a stepped piston 108 is slidably fitted into the through hole 105a of the cover member 105 fitting the seal ring 106 and the stepped bore 104 at the downwards side in FIG. 1. A through axial path 109 is formed in the stepped piston 108 so that one end of the path 109 is communicating with the through hole 105a of the cover member 105 and another end of the path 109 is communicating with the not-shown output opening. A valve seat 111 is formed at the opening of the input opening 123 side of the path 109 and the projecting portion 114a of a valve body 114 arranged in the through hole 105a of the cover member 105 is able to seat on, or separate from, the valve seat 111 with the movement of the stepped piston 108. The valve body 114 is urged towards the valve seat 111 by a valve spring 117 which is compressed extended between the valve body 114, and a retainer member or an annular element 116 fixed to the opening 105b of the through hole 105a of the cover member 105.

In the above-described fluid pressure control valve apparatus 101, the cover member 105 is fixed to the main body 102 by deforming plastically (caulking) an annular thin projecting portion 118 which is formed integrally with the main body 102 at the input opening 123 side. On the other hand, for the retainer member 116, its outer circumferential portion 116a is forced into engagement with and partially bitten to the inner wall of the opening 105b of the cover member 105. That is, as shown in FIG. 3A, a retainer member 116' has a dish-plate configuration in natural shape, and a diameter $D_3'$ of the outer circumferential portion 116'a of the dish-plate-shaped retainer member 116' is equal to or slightly less than a diameter $D_4$ of the opening 105b, in the natural shape. At first, the retainer member 116' is inserted into the opening 105b. Subsequently, as shown in FIG. 3B, the retainer member 116' is urged against a stepped portion 105c of the cover member 105 by a tubular press tool 150 until the dish-plate-shaped retainer member 116' is deformed into a planar-plate configuration. As shown in FIG. 3C, when the dish-shaped retainer member 116' is deformed into the planar-shaped retainer member 116, the diameter $D_3$ of the outer circumferential portion 116a of the retainermember116 increases to a value larger than the diameter $D_4$ of the opening 105b, so that the outer circumferential portion 116a of the retainer member 116 is forced into engagement with and partially bitten to the inner wall of the opening 105b.

However, in this case, the generation of the chips from inner wall of the opening 105b of the cover member 105 is unavoidable when the retainer member 116 is fixed to the cover member 105. Consequently, there are the disadvantages that the chips will bring about the damage of the seal ring 106 or the like. Also, in the assembling process of the cover member 105 and the retainer member 116, they are individually assembled into the fluid pressure control valve apparatus 101. Accordingly, the number of the assembling processes is increased.

FIG. 2 shows another fluid pressure control valve apparatus which is generally represented by a reference numeral 201. Although its shape is a little different from the fluid pressure control valve apparatus 101 in FIG. 1, the parts which correspond to the parts in FIG. 1, are denoted by the reference numerals added by one hundred, the description of which will be omitted.

In this fluid pressure control valve apparatus 201, a cover member 205 is fixed to a main body 202 by deforming plastically an annular thin projecting portion 218 towards the cover member 205 and fitting the annular thin projecting portion 218 into the groove 230 formed at the outer circumference of the cover member 205. Also, a retainer member 216 is fixed to the cover member 205 by deforming plastically its outer circumferential portion 216a towards the cover member 205 and engaging the outer circumferential portion 216a with the groove 230.

However, in this case also, in the assembling process of the cover member 105 and the retainer member 116, they are individually assembled into the fluid pressure control valve apparatus 201. Accordingly, the number of the assembling processes is increased. And it is necessary to form the groove 230 at the cover member 205. Accordingly, the processing cost is increased. Further, it is necessary to enlarge the length of the cover member 205 enough to form the groove 230. Accordingly, the total length of the fluid pressure control valve apparatus 201 is enlarged.

SUMMARY OF THE INVENTION

It is an object of this invention to provide a fluid pressure control valve apparatus in which the debris does not generate at fixing the retainer, the number of the assembling processes and the processing cost are not increased, and the total length of the fluid pressure control valve apparatus is reduced.

In accordance with an aspect of this invention, a fluid pressure control valve apparatus including:

(A) a main body in which an input opening is formed in communication with a master cylinder and an output opening is formed in communication with a wheel cylinder;

(B) a stepped bore made in said main body, in communication with said input opening and output opening, the diameter of said stepped bore being stepwisely enlarged in the direction towards said input opening side from said output opening side;

(C) cover means inserted into said input opening of the stepped bore, having a through hole;

(D) a stepped piston slidably fitted into said stepped bore, extending between said through hole of the cover means and said output opening side of the stepped bore;

(E) a path formed in said stepped piston, one end of said path be communicating with said through hole of the cover means and another end of said path be communicating with said output opening side;

(F) a valve seat formed at the one end of said path (G) a valve body being able to seat on, and separate from, said valve seat, arranged in a valve chamber formed in said through hole of the cover means;

(H) a valve spring urging said valve body toward said valve seat;

(I) retainer means arranged at said input opening side of the cover means, supporting one end of said valve spring;

(J) a pre-loaded spring for urging said stepped piston in the direction to separate from said valve body; and (K) an annular thin projecting portion formed integrally with said main body at said input ope ning side, being projected outwards from the end of said cover means, wherein said cover means is fixed to said main body by deforming plastically said annular thin projecting portion towards said cover means, the improvement in which an outer circumferential portion of said retainer means is held between the deformed annular thin projecting portion and said cover means.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Next, a fluid pressure control valve apparatus according to a first embodiment of this invention will be described with reference to the drawings.

Figure 1:
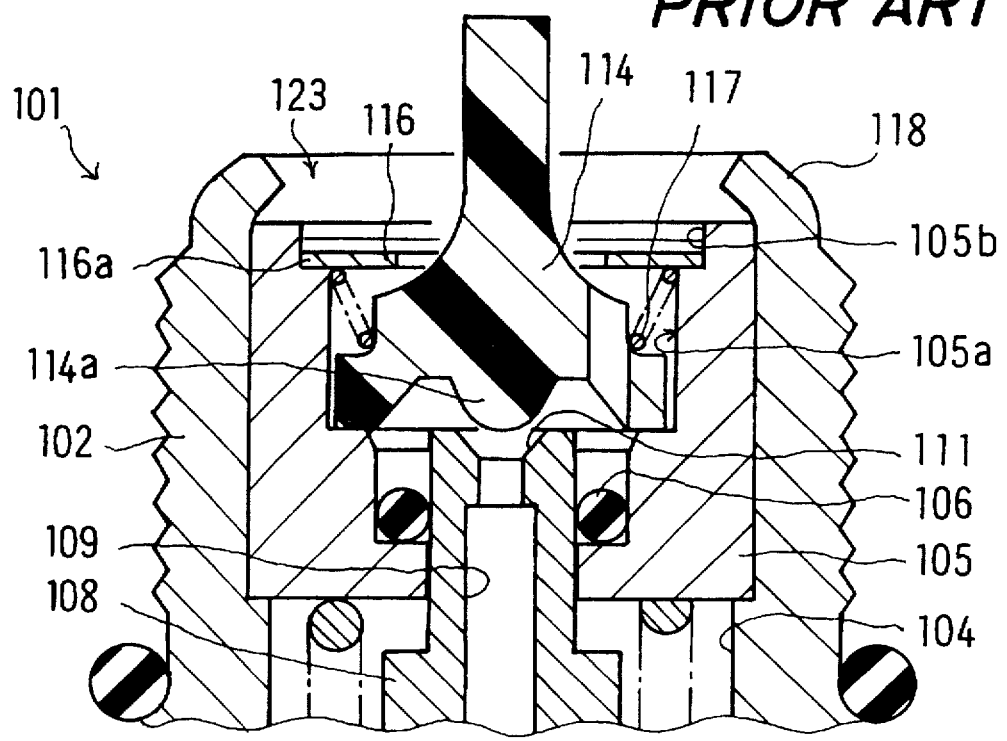
FIG. 1 is a partially cross-sectional view of a fluid pressure control valve apparatus of one Prior Art.
Figure 2:
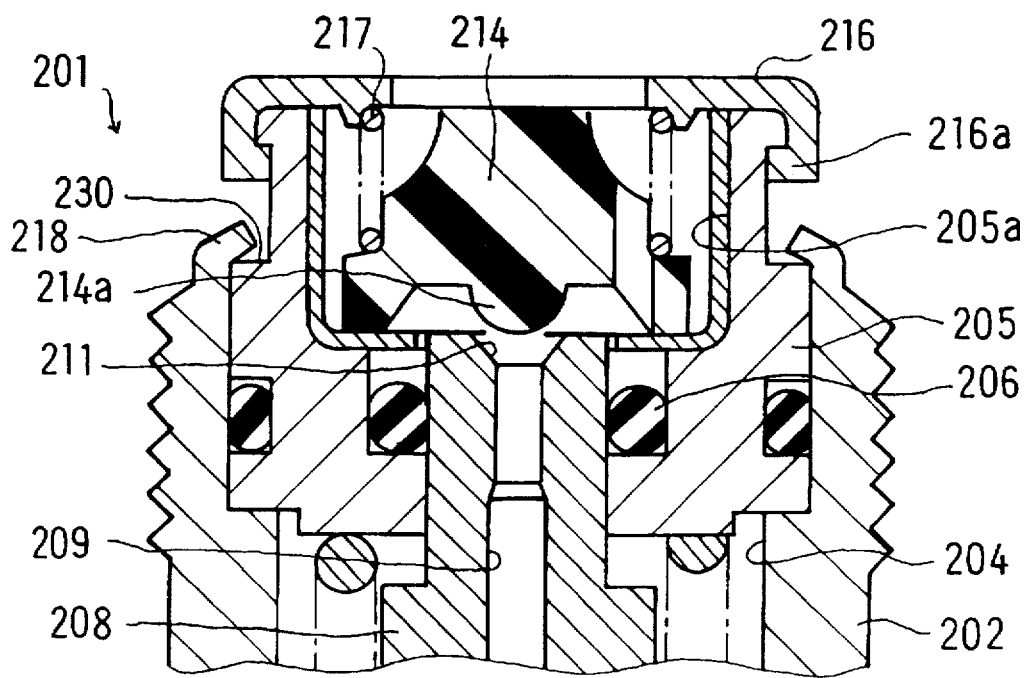
FIG. 2 is a partially cross-sectional view of a fluid pressure control valve apparatus of another Prior Art.
Figure 3:
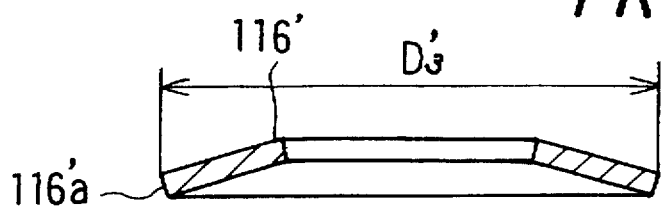
FIG. 3A to 3C are partially enlarged cross-sectional views showing a support structure and assembling process for a retainer member, in the one Prior Art.
Figure 3:
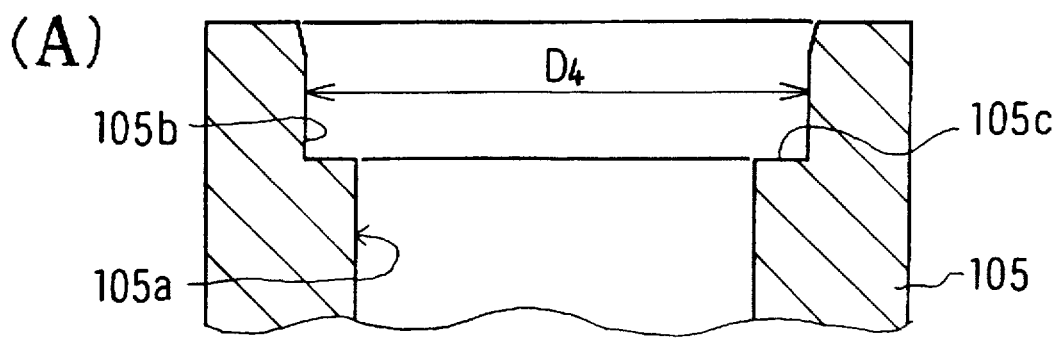
Figure 3:
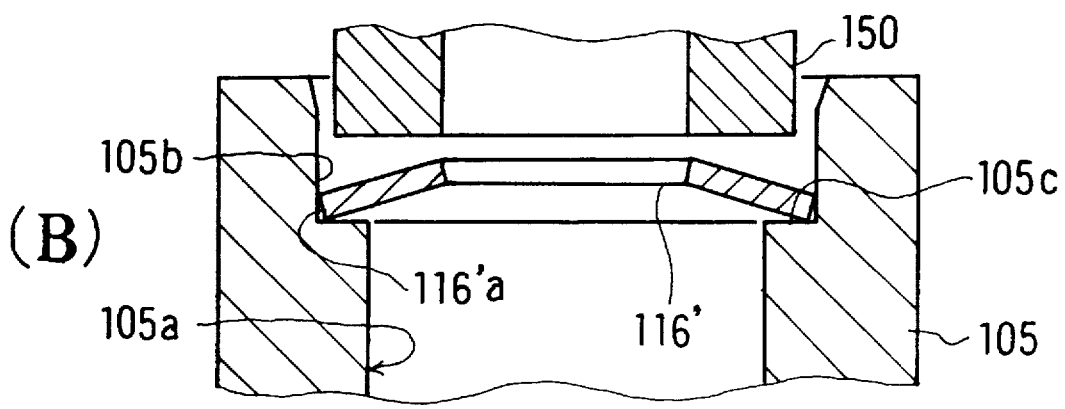
Figure 3:
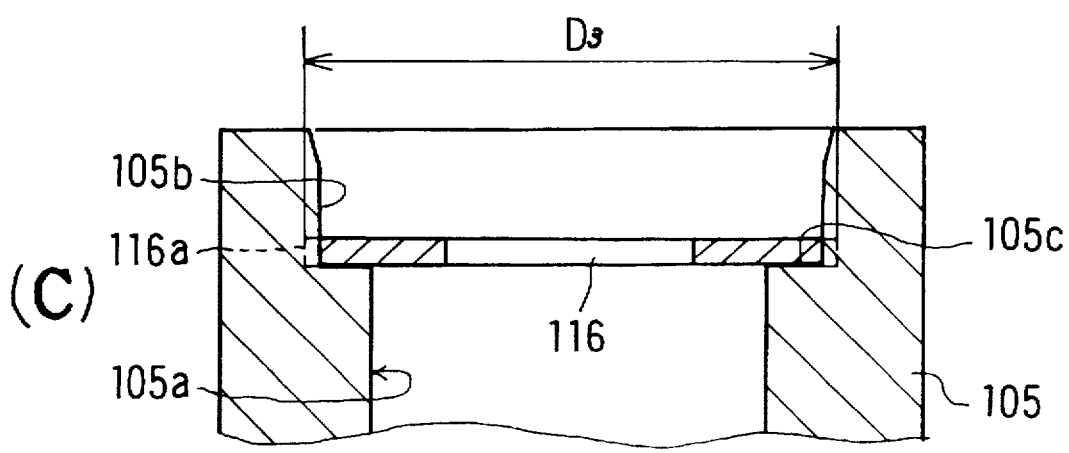
Figure 4:
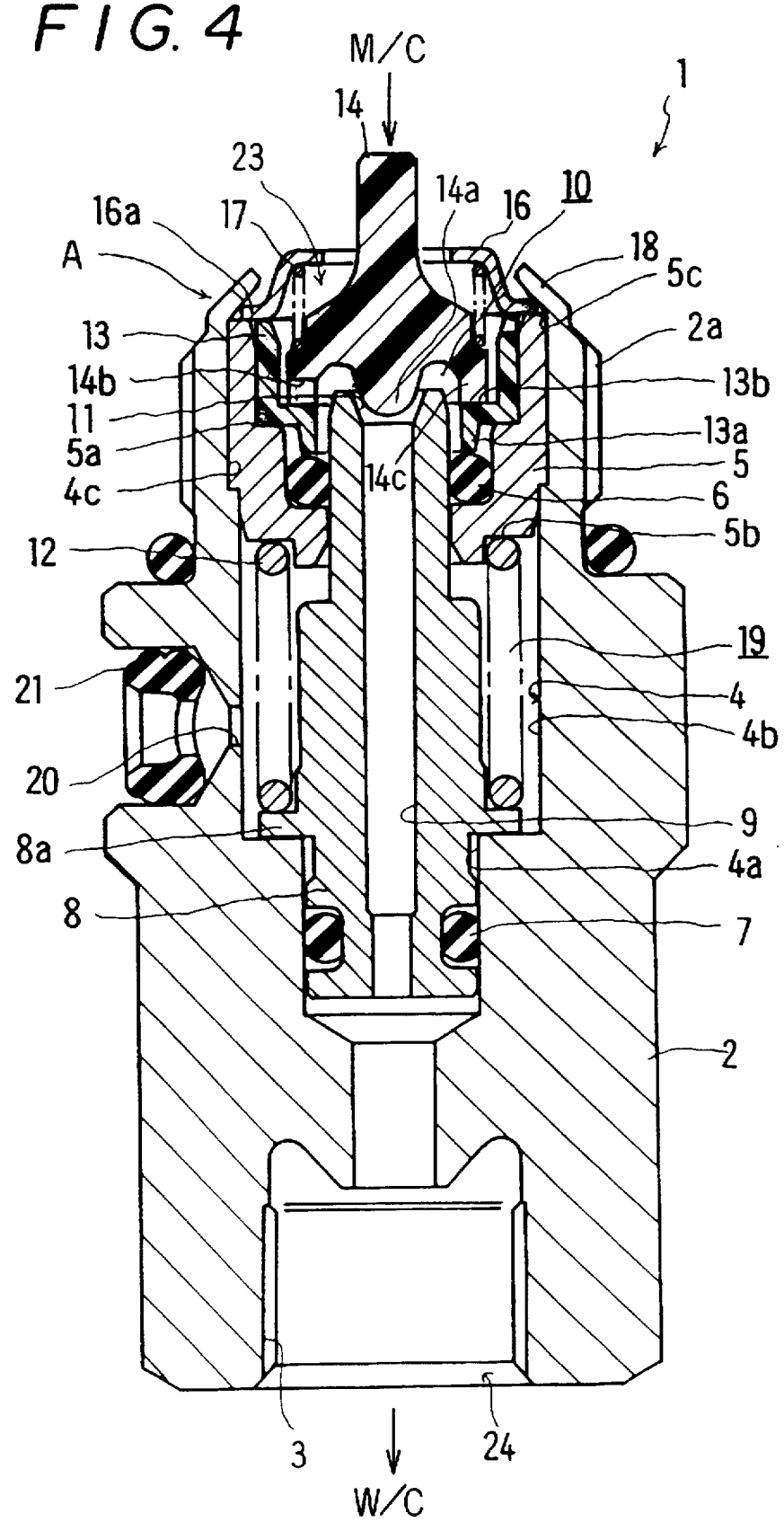
FIG. 4 is a cross-sectional view of a fluid pressure control valve apparatus according to a first embodiment of this invention.

A fluid pressure control valve according to this invention is generally denoted by a reference numeral 1 in FIG. 4. A main body 2 has an input opening 23 formed in communication with a not-shown master cylinder and an outer opening 24 formed in communication with a not-shown wheel cylinder. Screw threads 2a fixed to the master cylinder is formed at the outer circumferential portion of the input opening 23 in the main body 2. A connecting hole 3 for communication with the wheel cylinder is formed at the output opening 24 in the main body 2.

A stepped bore 4 is made in the main body 2 so as to communicate with the input opening 23 and the output opening 24. The diameter of the stepped bore 4 is stepwisely enlarged in the direction towards the input opening 23 side from the output opening 24 side, so that a small-diameter hole portion 4a, a middle-diameter hole portion 4b and a large-diameter hole portion 4c are formed in the stepped bore 4. A cover member 5 having a through hole 5a is inserted into the large-diameter hole portion 4c of the stepped bore 4. A stepped piston 8 made of metal is slidably fitted into the through hole 5a of the cover member 5 and the small-diameter hole portion 4a of the stepped bore 4, respectively. Rubber seal rings 6 and 7 are tightly fitted to the stepped piston 8 at the small-diameter hole portion 4a of the stepped bore 4 and the through hole 5a of the cover member 5, respectively, which are slidably fitted to the small-diameter hole portion 4a of the stepped bore 4 and the through hole 5a of the cover member 5 thereof, respectively. A through axial path 9 is formed in the stepped piston 8. One end of the path 9 is communicating with the through hole 5a of the cover member 5 and another end of the path 9 is communicating with the output opening 24 side. A mortar-shaped or conical valve seat 11 is formed at the opening of the input opening 23 side of the path 9. A pre-loaded spring 12 is compressedly extended between a flange portion 8a formed integrally with the stepped piston 8 and a bottom 5b of the cover member 5. Accordingly, the stepped piston 8 is urged towards the side of the output opening 24 of the main body 2. A lateral through hole 20 is formed in the main body 2 so as to release pressure in an air chamber 19 formed between the rubber seal rings 6 and 7 in the case the pressure becomes higher than a predetermined pressure. And a plug 21 made of rubber is fitted to the lateral through hole 20 of the main body 2 and seal the through hole 20.

A cylindrical member 13 made of plastic is fitted to the through hole 5a of the cover member 5, and the rubber seal ring 6 is prevented from pulling out by the lower end portion of the cylindrical member 13. A poppet-type valve body 14 made of plastic is arranged in a valve chamber 10 formed at the inside of the cylindrical member 13. An annular leg portion 14c is formed at the outer circumference of the poppet-type valve body. 14. The leg portion 14c contacts with a stepped portion 13b of the cylindrical member 13. A cut-out 14b is formed at the part of the leg portion 14c of the poppet-type valve body 14. A hemispherical projecting portion 14a projecting towards the valve seat 11 is formed at the center of the lower end of the poppet-type valve body 14. The projecting portion 14a of the poppet-type valve body 14 is able to seat on, or separate from, the mortar-shaped or conical valve seat 11, which is formed at the end of the input opening 23 side of the path 9, with the upwards and downwards movement of the stepped piston 8 in FIG. 4 and it projects towards the valve seat 11. Further, the projecting portion 14a is so shaped as to position at the inside of the valve seat 11 when the stepped piston 8 is positioned even at the output opening 24 side of the main body 2.

A retainer member 16 is arranged at the upper end of the cover member 5, and a valve spring 17 is compressed extended between the poppet-type valve body 14 and the retainer member 16. Accordingly, the poppet-type valve body 14 is urged towards the valve seat 11 by the spring force of the valve spring 17.

Next, the method of fixing the cover member 5 and the retainer member 16 to the main body 2 will be described.

An annular thin projecting portion 18 is formed integrally with the main body 2 at the input opening 23 side and projected outwards from the end of the cover member 5. The cover member 5 is fitted to the large-diameter hole portion 4c of the stepped bore 4 in the condition that it contacts with the outer circumferential portion 16a of the retainer member 16 against the spring force of the valve spring 17. Next, the cover member 5 is fixed to the main body 2 by deforming plastically (caulking) the annular thin projecting portion 18 towards the cover member 5, so that the annular thin projecting portion 18 is deformed into a coned-shape as shown in FIG. 4. Then, the annular thin projecting portion 18 is pressured to one end corner 5c of the cover member 5, and thereby, the gap between the main body 2 and the cover member 5 is air-tightly closed. Simultaneously, an outer circumferential portion 16a of the retainer member 16 is held between the deformed annular thin projecting portion 18 and the cover member 5 as shown in FIG. 4.

Figure 5:
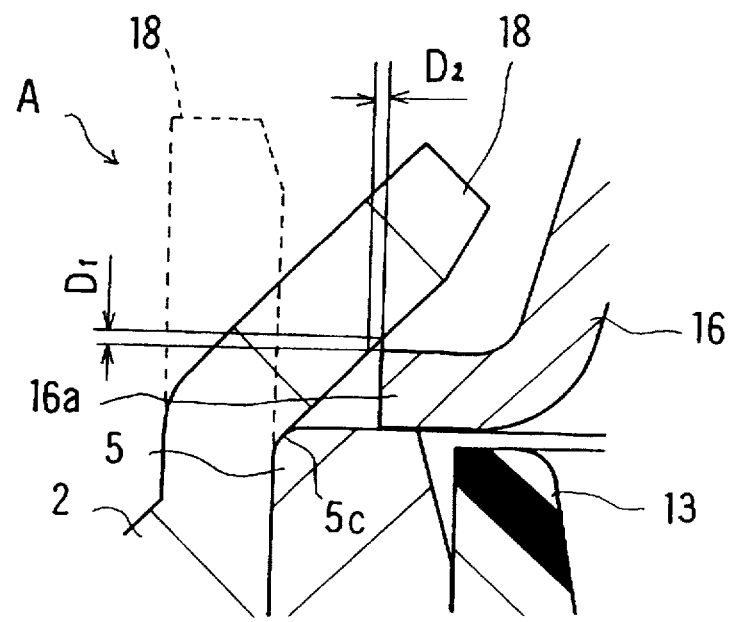
FIG. 5 is an enlarged view of a part denoted by a reference symbol A in FIG. 4.

FIG. 5 shows an enlarged view of the part of the reference symbol A in FIG. 4. The retainer member 16 is so shaped as to form gaps $D_1$ and $D_2$ between the annular thin projecting portion 18 and the outer circumferential portion 16a in the condition that the annular thin projecting portion 18 is plastically deformed into the coned-shape. In FIG. 5, $D_1$ represents an axial gap between the annular thin projecting portion 18 and the outer circumferential portion 16a, and $D_2$ represents a radial gap between the annular thin projecting portion 18 and the outer circumferential portion 16a. Normally, the outer circumferential portion 16a of the retainer member 16 contacts with the annular thin projecting portion 18 by the spring force of the valve spring 17, however, FIG. 5 shows the condition that the retainer member 16 contacts the upper end of the cover member 5 against the spring force of the valve spring 17 for explanation of this invention.

Thus, since the gaps $D_1$ and $D_2$ are formed between the annular thin projecting portion 18 and the outer circumferential portion 16a of the retainer member 16, it is prevented that the retainer member 16 interrupts the plastic deformation with pressure of the annular thin projecting portion 18 towards the cover member 5. Accordingly, the gap between the main body 2 and the cover member 5 is surely and air-tightly closed.

Accordingly, differing from the Prior Arts, the chips are not generated in the process when the retainer member 16 is fixed to the cover member 5. And the number of the assembling processes, man-hour cost and processing cost can be reduced, since it is unnecessary to form the groove at the cover member 5 to engage with the retainer member 16. That is, the cover member 5 and the retainer member 16 can be fixed to the main body 2 by only one step of the plastic deformation of the annular thin projecting portion 18 towards the cover member 5. Further, the total length of the fluid pressure control valve apparatus 1 can be reduced, and the gap between the cover member 5 and the main body 2 is surely and air-tightly closed.

Next, there will be described operations of the above described fluid pressure control valve apparatus 1.

FIG. 4 shows the condition at the time when no brake is applied.

When no brake is applied, the poppet-type valve body 14 is separated from the valve seat 11, since the stepped piston 8 is positioned at the output 24 side by spring action of the spring 12. When the driver acts the braking operation and the pressurized fluid is supplied into the input opening 23 from the not-shown master cylinder side, the pressurized fluid is supplied to the not-shown wheel cylinder through the cut-out 14b formed at the leg portion 14c of the poppet-type valve body 14, the gap between the projecting portion 14a of the poppet-type valve body 14 and the valve seat 11, and the path 9 formed in the stepped piston 8. Accordingly, the brake is applied.

The stepped piston 8 moves upwards (the input opening 23 side) in FIG. 4 when the fluid pressure from the master cylinder side is increased to a predetermined pressure. The predetermined pressure is determined by the spring force of the pre-loaded spring 12 and the difference between the fluid-pressure receiving areas of both sides of the stepped piston 8. The mortar-shaped or conical valve seat 11 formed at the upper end of the stepped piston 8 comes to contact with the projecting portion 14a of the poppet-type valve body 14, that is, the valve body 14 seats on the valve seat 11. Accordingly, the supply of the pressurized fluid towards the wheel cylinder from the master cylinder is stopped. Further, the fluid pressure of the master cylinder side of the stepped piston 8 is increased, so that the fluid pressure grows higher than the wheel cylinder side. Accordingly, the stepped piston 8 moves downwards in FIG. 4, and the poppet-type valve body 14 is separated from the valve seat 11. Thus, it is repeated that the poppet-type valve body 14 seats on, and separates from, the valve seat 11, so that the holding, and increasing of the fluid pressure of the wheel cylinder side are repeated, and the fluid pressure control as well-known is operated.

When the driver releases the not-shown brake pedal from treading, the stepped piston 8 moves downwards and the projecting portion 14a of the poppet-type valve body 14 is separated from the valve seat 11. Accordingly, the brake fluid returns to the master cylinder side from the wheel cylinder side. Thus, the brake is released.

Figure 6:
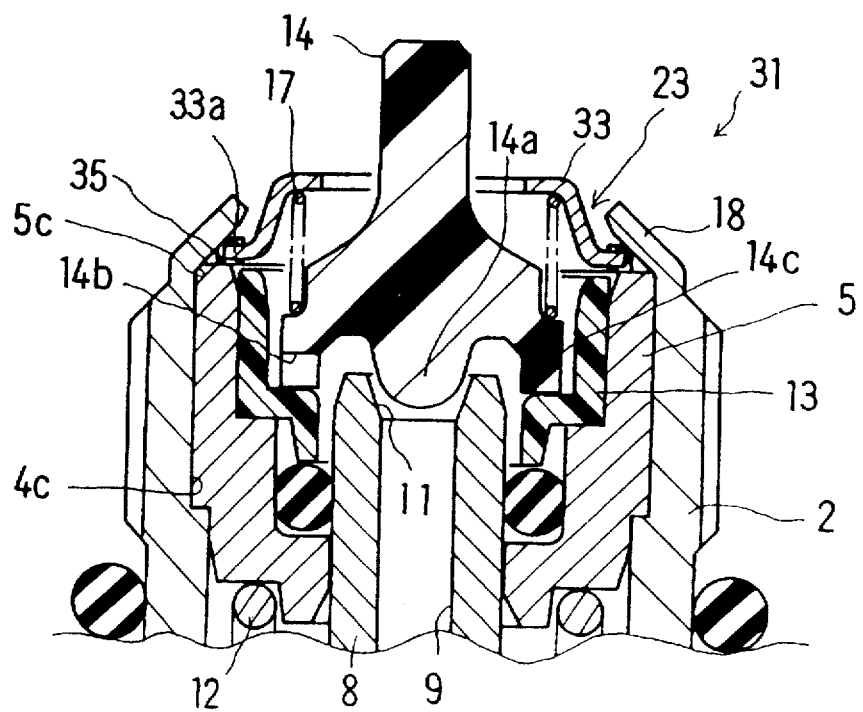
FIG. 6 is a cross-sectional view of a fluid pressure control valve apparatus according to a second embodiment of this invention.

FIG. 6 shows a, partially cross-sectional view of the fluid pressure control valve apparatus 31 according to a second embodiment of this invention. The parts which correspond to the parts in FIG. 4, are denoted by the same reference numerals, the description of which will be omitted.

The fluid pressure control valve apparatus 31 in this embodiment is nearly similar to the fluid pressure control valve apparatus 1 in the first embodiment, that is, the cover member 5 and the retainer member 33 are fixed to the main body 2 by deforming plastically the annular thin projecting portion 18 towards the cover member 5. However, a sealing member 35 is tightly attached to the outer circumferential portion 33a of the retainer member 33 and the sealing member 35 is depressed between the annular thin projecting portion 18 and the cover member 5, thereby the gap between the main body 2 and the cover member 5 is closed. The sealing member 35 is made of rubber and molded to the outer circumferential portion 33a of the retainer member 33.

According to this embodiment, it can be sure to close the gap between the annular thin projecting portion 18 and the retainer member 33 by pressure of the annular thin projecting portion 18 to the outer circumferential portion 33a of the retainer member 33. And it can prevent the closeness between the main body 2 and the cover member 5 from being incomplete by a dent, if any, made on the one end corner 5c, where the annular thin projecting portion 18 pressures. Further, the gap between the main body 2 and the cover member 5 is more air-tightly closed by elastic deformation of the sealing member 35 between the outer circumferential portion 33a and the annular thin projecting portion 18, and between the outer circumferential portion 33a and the cover member 5. Accordingly, there is no problem that the annular thin projecting portion 18 is interrupted by the retainer member 33 when the annular thin projecting portion 18 is deformed plastically towards the cover member 5. That is, differing from the first embodiment, although the gap $D_1$ and $D_2$ are not formed between the annular thin projecting portion 18 and the outer circumferential portion 33a of the retainer member 33, the pressuring force is absorbed by the sealing member 35 without touching directly the outer circumferential portion 33a of the retainer member 33, when the annular thin projecting portion 18 is deformed plastically towards the cover member 5.

Since the operation of the fluid pressure control valve apparatus 31 in this embodiment is similar to the operation of the fluid pressure control valve apparatus 1 described in the first embodiment, the description of the operation will be omitted.

While the preferred embodiment has been described, variations thereto will occur to those skilled in the art within the scope of the present inventive concepts which are delineated by the following claims.

For example, in the first embodiment, seal members, such as O-ring seal, may be fitted between the main body 2 and the cover member 5 in order to perfect the closeness between the main body 2 and the cover member 5. However, according to the constitution described in the second embodiment, it is unnecessary to form the groove at the main body or the cover member to fit the further seal members and so the processing cost can be reduced.

Further, although cover means are composed of the cover member 5 and the cylindrical member 13 in the first and second embodiments, it may be composed of one single member.

What is claimed is:

1. In a fluid pressure control valve apparatus, including:

(A) a main body in which an input opening is formed in communication with a master cylinder and an output opening is formed in communication with a wheel cylinder;

(B) a stepped bore made in said main body, in communication with said input opening and output opening, the diameter of said stepped bore being stepwisely enlarged in the direction towards said input opening side from said output opening side;

(C) cover means inserted into said input opening of the stepped bore, having a through hole;

(D) a stepped piston slidably fitted into said stepped bore, extending between said through hole of the cover means and said output opening side of the stepped bore;

(E) a path formed in said stepped piston, one end of said path be communicating with said through hole of the cover means and another end of said path be communicating with said output opening side;

(F) a valve seat formed at the one end of said path;

(G) a valve body being able to seat on, and separate from, said valve seat, arranged in a valve chamber formed in said through hole of the cover means;

(H) a valve spring urging said valve body toward said valve seat;

(I) retainer means arranged at said input opening side of the cover means, supporting one end of said valve spring;

(J) a pre-loaded spring for urging said stepped piston in the direction to separate from said valve body; and (K) an annular thin projecting portion formed integrally with said main body at said input opening side, being projected outwards from the end of said cover means, wherein said cover means is fixed to said main body by deforming plastically said annular thin projecting portion towards said cover means, the improvement in which an outer circumferential portion of said retainer means is held between the deformed annular thin projecting portion and said cover means.

2. A fluid pressure control valve apparatus according to claim 1, in which said annular thin projecting portion is pressured to one end corner of said cover means and thereby the space between said main body and said cover means is closed.

3. A fluid pressure control valve apparatus according to claim 2, in which said retainer means is so shaped as to form gap between said annular thin projecting portion and said retainer means in the condition that said annular thin projecting portion is plastically deformed.

4. A fluid pressure control valve apparatus according to claim 1, in which sealing means is formed integrally with the outer circumferential portion of said retainer means and said sealing means is depressed between said annular thin projecting portion and said cover means, thereby the gap between said main body and said cover means being closed.

5. A fluid pressure control valve apparatus according to claim 4, in which said seal means is made of rubber and molded to said retainer means.

* * * * *